TELEVISION SYNCHRONIZING PULSE GENERATOR

Filed July 10, 1958 5 Sheets-Sheet 1

Inventor
George H. Fathauer
by Hill, Sherman, Meroni, Gross & Simpson Attys

Oct. 31, 1961 G. H. FATHAUER 3,006,995

TELEVISION SYNCHRONIZING PULSE GENERATOR

Filed July 10, 1958 5 Sheets-Sheet 2

Inventor
George H. Fathauer by Hill, Sherman, Meroni, Gross & Simpson Attys

Inventor
George H. Fathauer
by Hill, Sherman, Meroni, Gross & Simpson Attys

Oct. 31, 1961 G. H. FATHAUER 3,006,995

TELEVISION SYNCHRONIZING PULSE GENERATOR

Filed July 10, 1958 5 Sheets-Sheet 4

Inventor
George H. Fathauer by Hill, Sherman, Meroni, Gross & Simpson Attys

Oct. 31, 1961 G. H. FATHAUER 3,006,995

TELEVISION SYNCHRONIZING PULSE GENERATOR

Filed July 10, 1958 5 Sheets-Sheet 5

Inventor
George H. Fathauer
by Hill, Sherman, Meroni, Gross & Simpson Attys

United States Patent Office 3,006,995
Patented Oct. 31, 1961

3,006,995
TELEVISION SYNCHRONIZING PULSE GENERATOR

George H. Fathauer, Decatur, Ill., assignor to Thompson Ramo Wooldridge, Inc., a corporation of Ohio
Filed July 10, 1958, Ser. No. 747,645
28 Claims. (Cl. 178—7.2)

This invention relates to a pulse generator and more particularly to a synchronizing pulse generator for use in television systems.

In a conventional television system, an image is focused on a camera tube screen having photo-electrical properties such that a varying electrical signal is produced as it is scanned by an electron beam. This signal, referred to as a video signal, is transmitted to a receiver to control the intensity of an electron beam impinged on the luminescent screen of a picture tube, thereby to reproduce the image focused on the camera tube screen.

To obtain proper reproduction, it is necessary that the scanning of the camera tube screen and the scanning of the picture tube screen be accomplished in the same regular pattern, and in exact synchronism.

In a conventional scanning system, high frequency horizontal sweet signals are applied to cause the beams to periodically move from left to right across the screens to thereby trace horizontal lines. Vertical sweep signals of considerably lower frequency are simultaneously applied to periodically move the beams from top to bottom and thereby spread out the horizontal traces on the screens.

Usually, it is desirable to use an interlace scanning system in which the horizontal lines developed during each vertical traverse of the screen are caused to fall between the horizontal lines developed during the next preceding vertical traverse. This interlace technique reduces flicker effects and is accomplished by making the horizontal sweep frequency equal to an odd multiple of the vertical sweep frequency, divided by an even number.

This invention relates to a synchronizing pulse generator, which generates pulse signals used to control and synchronize the operation of the camera and receiver sweep circuits. This instrument generates horizontal and vertical drive pulses which are respectively applied to the horizontal and vertical sweep circuits of the camera to initiate each horizontal trace of the electron beam and each vertical traverse.

The instrument also generates a composite synchronizing signal which is transmitted to the receiver along with the video signal. In a standard system, as prescribed by the Federal Communications Commission, the composite signal includes short pulses referred to as horizontal synchronizing pulses which are transmitted at the rate of 15,750 per second to initiate the horizontal traces of the beam from left to right. The video signal is transmitted in the time intervals between the horizontal synchronizing pulses, to control the intensity of the trace of the picture tube.

The composite signal further includes trains of vertical synchronizing pulses. In a standard system, trains of six such pulses are transmitted at intervals of 1/60 of a second, each train of six pulses having a duration equal to the time required for the tracing of three horizontal lines. These vertical synchronizing pulses have a much greater duration than the horizontal synchronizing pulses, the purpose being to develop a signal in an integrator circuit of the receiver of sufficient amplitude to initiate operation of the vertical traverse of the beam from top to bottom. The integrator circuit is so designed as to respond to the vertical synchronizing pulses, because of their greater duration, but does not respond to the short duration horizontal synchronizing pulses.

In addition to horizontal and vertical synchronizing pulses, the composite signal in an interlace system should further include a pair of trains of short-duration equalizing pulses transmitted immediately before and immediately after each train of vertical synchronizing pulses.

The purpose of equalizing pulses is to insure proper operation of the integrator circuit and accurate interlace. In a standard system, each of such trains of equalizing pulses consists of six pulses and each has a total duration equal to the time required for tracing of three horizontal lines. It may thus be noted that in a standard interlace system, the total duration of each complete vertical synchronizing signal of both equalizing and synchronizing pulses is equal to the time required for the tracing of nine horizontal lines and during this interval, the pulses are transmitted at twice the repetition rate of the horizontal pulses.

The composite signal transmitted to the receiver may further include blanking pulses which are applied to the intensity control of the picture tube in a direction to black out the beam during retrace, i.e., during the rapid return movement of the beam from right to left after tracing a horizontal line. Each horizontal blanking pulse should start ahead of and finish after the corresponding horizontal synchronizing pulse. When illustrated graphically on a time base, the horizontal blanking pulses form "pedestals" for the horizontal synchronizing pulses. The portion of the blanking signal which precedes the corresponding horizontal synchronizing pulse is referred to as the "front porch" and the portion which follows is referred to as the "back porch."

It will thus be apparent that a number of pulses of different repetition rates, starting times and durations must be generated and properly combined in a synchronizing pulse generator.

With respect to the means required for generation of a composite synchronizing signal it is necessary to generate control signals at the low frequency vertical repetition rate. For example, in a standard system, it is necessary to generate at intervals of 1/60 of a second, signals having a duration equal to the time required to trace three horizontal lines, this signal being used to control the generation of the vertical pulses. To control generation of the equalizing pulses, a signal which is "on" for three horizontal lines, then "off" for three horizontal lines, and then "on" again for three horizontal lines may be required.

To generate such low frequency control signals, it has heretofore been the practice to develop low frequency control pulses by use of a frequency divider chain excited from a high frequency source (31,500 c.p.s. in a standard system) and to use such control pulses to trigger multi-vibrator circuits. Such systems have either been unduly complex or have been unstable and have required large numbers of controls and careful and accurate adjustment.

To generate the composite synchronizing signals, the previous procedure has been to apply the low frequency control signals to gate circuits used to controllably conduct signals from output taps of an electrical delay line to a synchronizing pulse generator in the form of a multivibrator. High frequency pulses applied to the input end of the delay line are delayed in proportion to the distance between the output tap and the input end. Such pulses, applied at appropriate times through the gate circuits, serve to trigger the multivibrator "on" and "off" and thus determine the starting and finishing times of the pulses generated by the multivibrator.

In a system previously developed by me, considerable simplification was accomplished by using various improvements, including the use of monostable multivibrator means to generate the composite synchronizing signal. That system eliminated the need for pulses to determine the finishing times or "rears" of the respective pulses and also eliminated the need for gate circuits previously used to apply the corresponding triggering signals.

This invention was evolved with the objects of further simplifying and improving the construction and operation of pulse generators; reducing size, reducing the number of component parts, particularly expensive, precision parts; and minimizing the necessity of adjustments while increasing the accuracy of generation of the various signals.

In the synchronizing pulse generator of this invention, triggering pulses generated at twice the horizontal repetition rate are applied through a single gate circuit to a single one-shot or monostable multivibrator used to generate the composite synchronizing signal. The gate circuit normally operates to transmit alternate triggering signals to initiate generation of the horizontal and synchronizing pulses, but is periodically rendered operative for an interval equal to the duration of nine horizontal lines, to initiate generation of the equalizing and vertical synchronizing pulses at twice the repetition rate of the horizontal synchronizing pulses.

To satisfy the requirement that the horizontal, vertical and equalizing pulses have different durations, a timing circuit of the single monostable multivibrator is controlled. Preferably, the timing circuit is a resistance-capacitance circuit and switching devices are used to control the resistance of the circuit. A high resistance is used during the vertical pulse interval, to obtain pulses of large duration. Another resistance is connected in parallel to obtain shorter-duration horizontal pulses. A third resistance is connected in parallel to obtain the equalizing pulses of still shorter duration.

Further features reside in the use of a pair of transistors in the monostable multivibrator and in switching circuits used to control the time constant of the timing circuit thereof. By the use of transistors in this combination, it is found possible to generate the pulses with a high degree of accuracy and with a minimum number of precision components, the only precision components required being those in the timing circuit of the one-shot or monostable multivibrator.

Another important feature of this invention is in the generation of low frequency control signals by use of a coincidence circuit having a plurality of inputs connected directly to stages of a frequency divider chain. With such an arrangement, it is possible to directly generate a control signal which is of one value or "on" during the vertical pulse intervals and which is of another value or "off" the remainder of the time. In a system designed for F.C.C. requirements, this signal has a duration equal to the time required to trace three horizontal lines and is referred to herein as a "3H" signal.

It is also possible to directly generate another control signal which is "on" during the equalizing pulse intervals and "off" the remainder of the time. In a system designed to meet F.C.C. requirements, this signal is "on" during intervals of three horizontal lines, preceding and following the three line vertical signal. It is herein referred to as a "9H" signal.

Another feature of the invention resides in the construction of a binary type frequency divider chain and connections thereto to obtain the signals required to be applied to the coincidence circuits to obtain the control signals. With this feature, a highly stable and reliable performance is achieved, without however requiring any adjustable or precision components.

Further important features are in the provision of simplified circuits for obtaining required time delays, and in circuits for generating a composite blanking signal.

This invention contemplates other and more specific objects, features and advantages which will become more fully apparent from the following detailed description taken in conjunction with the accompanying drawings which illustrate a preferred embodiment and in which.

Figure 1:
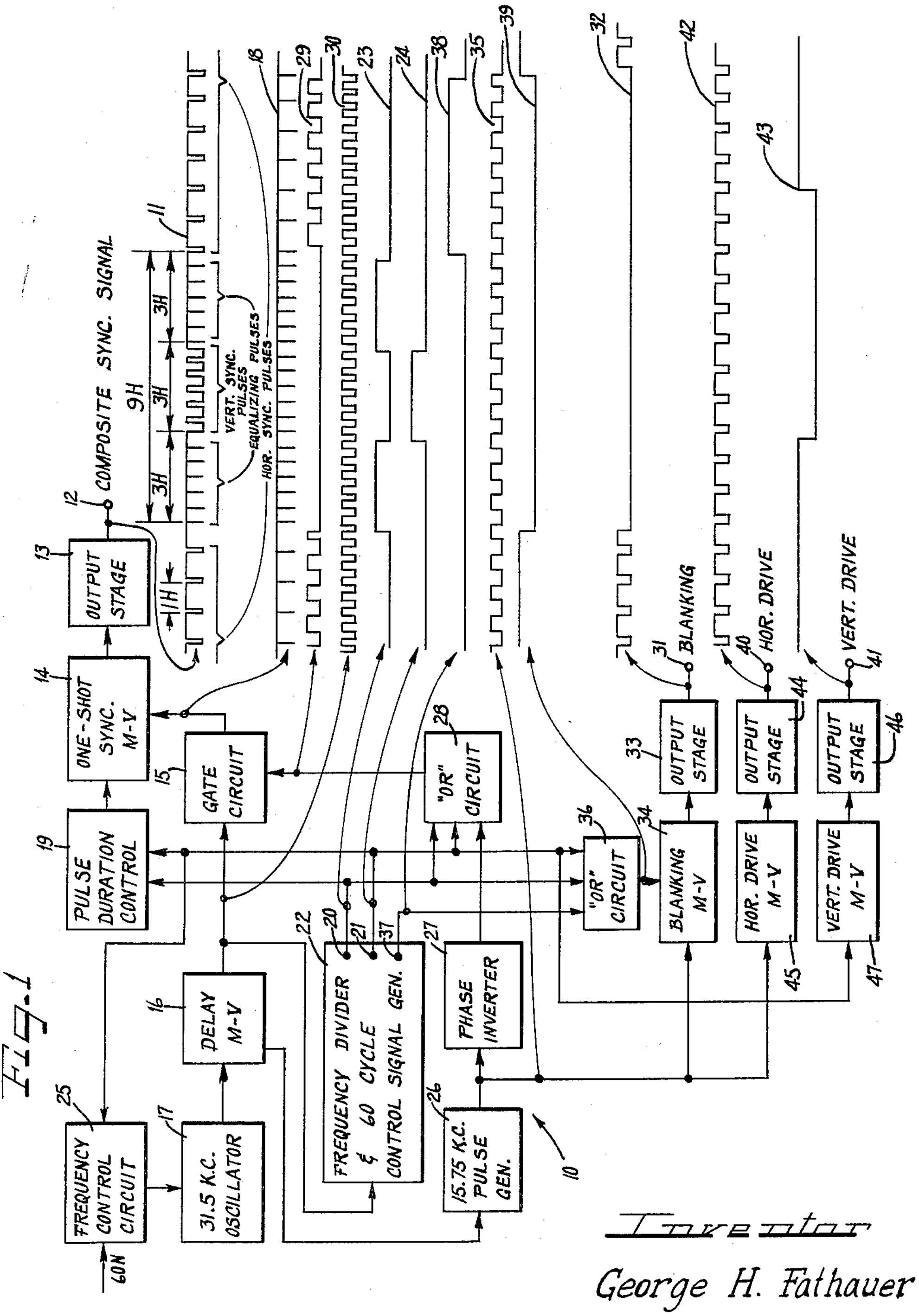
FIGURE 1 is a block diagram of the synchronizing pulse generator of this invention, with the signals produced at various points being illustrated graphically.
Figure 5:
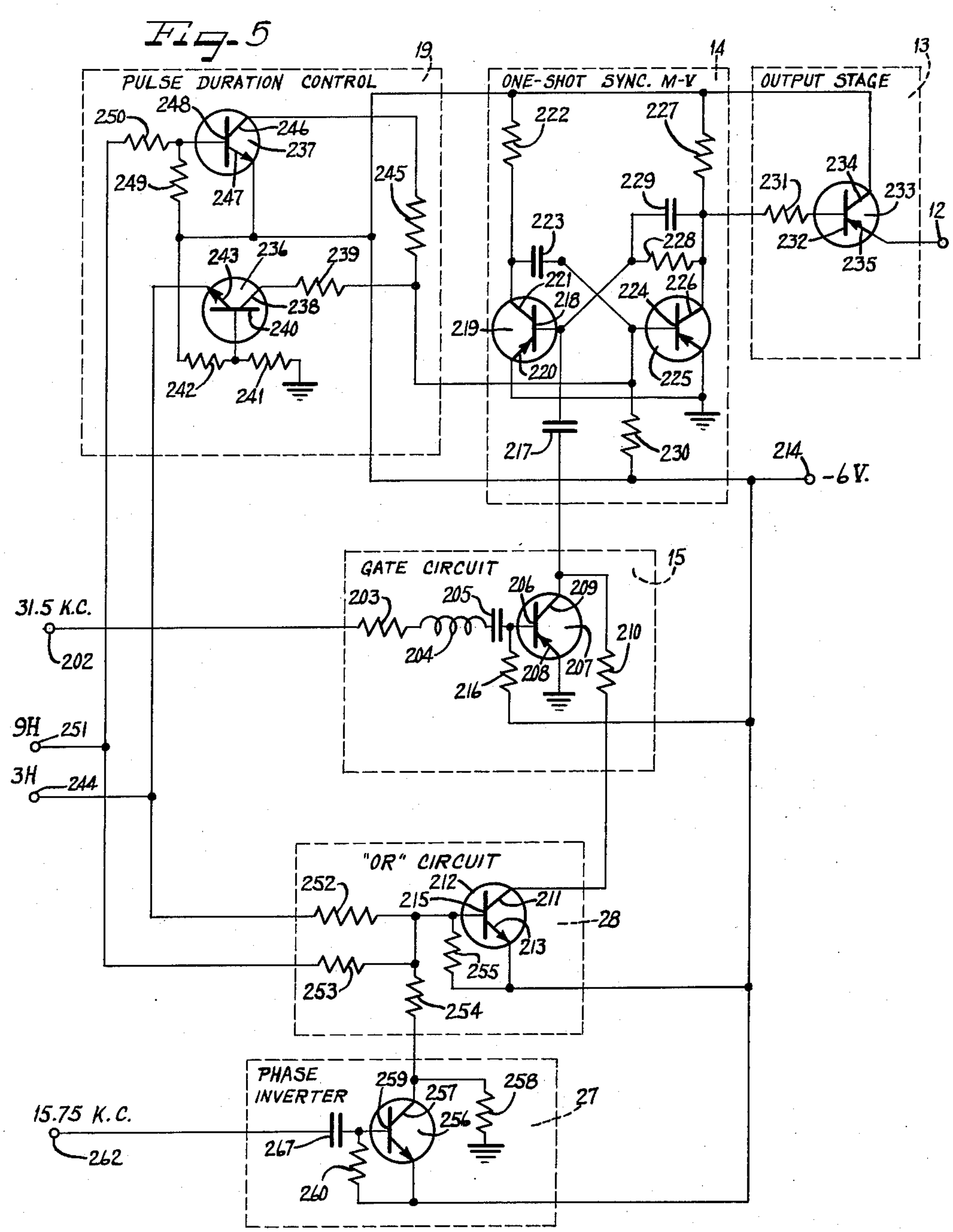
Figure 6:
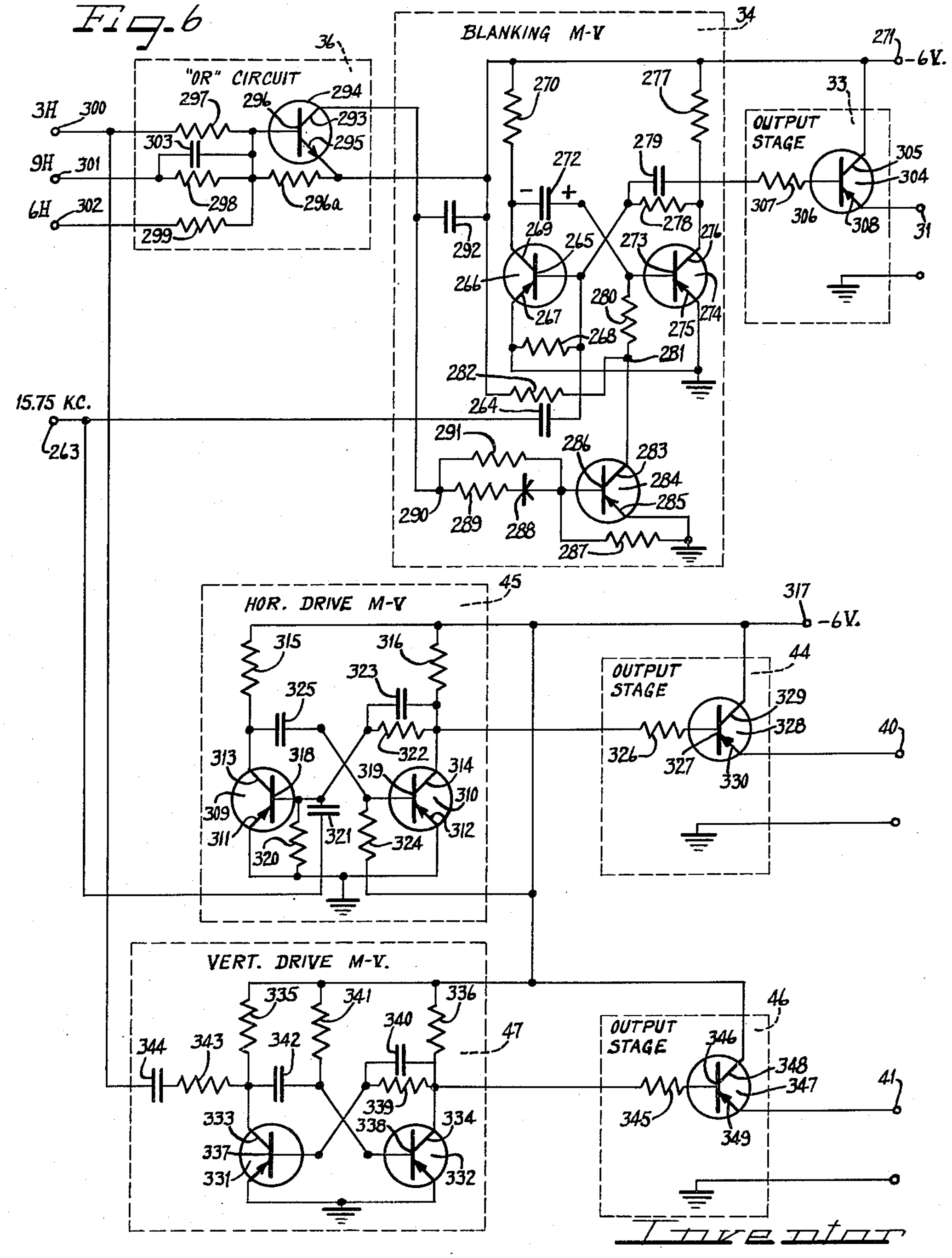

FIGURE 5 is a circuit diagram of the pulse duration control circuit, the one-shot sync multivibrator circuit, the output stage circuit, the gate circuit, the "OR" circuit and the phase inverter circuit illustrated in block form in FIGURE 1; and FIGURE 6 is a circuit diagram of another "OR" circuit, a blanking multivibrator circuit, a horizontal drive multivibrator circuit, a vertical drive multivibrator circuit, and output stages illustrated diagrammatically in FIGURE 1.

Reference numeral 10 in FIGURE 1 generally designates a synchronizing pulse generator constructed according to the principles of this invention. At the upper right of FIGURE 1, a composite synchronizing signal is illustrated graphically on a time base, this signal being indicated by reference numeral 11 and being produced at an output terminal 12 of the generator. As shown, the composite synchronizing signal comprises horizontal synchronizing pulses of negative polarity, which have a repetition rate of 15,750 per second. These pulses are used at the receiver to initiate each horizontal trace of the electron beam from left to right. The time interval between such pulses is indicated as being "1H," meaning the time required for the tracing of one horizontal line.

At intervals of 1/60 of a second, a complete vertical synchronizing signal is produced. This complete vertical synchronizing signal comprises a train of six vertical synchronizing pulses, which have a repetition rate equal to 31,500 per second, or twice the horizontal repetition rate, the time interval required for the six vertical synchronizing pulses being thus "3H," i.e., the time required for tracing of three horizontal lines. The vertical synchronizing pulses have a duration much greater than that of the horizontal synchronizing pulses, the purpose being to cause response of an integrator circuit at the receiver, to initiate the vertical sweep.

The complete vertical synchronizing signal further includes a pair of trains of six equalizing pulses preceding and following the train of vertical synchronizing pulses. The equalizing pulses, like the vertical synchronizing pulses, have a repetition rate of 31,500 per second or twice the horizontal repetition rate, and the time required for each train of equalizing pulses is equal to "3H." It will be noted that the equalizing pulses have a much shorter duration than the horizontal synchronizing pulses.

The composite synchronizing signal output terminal 12 is connected to an output stage 13 having an input connected to a one-shot or monostable multivibrator 14. The multivibrator 14 has an input connected through a gate circuit 15 to a delay multivibrator 16 controlled by a 31.5 k.c. oscillator 17. The gate circuit 15 functions to supply triggering pulses to the multivibrator 14, as shown graphically at 18 in FIGURE 1. It will be noted that these triggering pulses are normally repeated at the horizontal repetition rate of 15,750 per second, but during the complete vertical signal, they are repeated at twice the horizontal repetition rate, or 31,500 per second.

The one-shot sync multivibrator 14 generates one pulse in response to each triggering signal applied thereto. To control the duration of the pulses developed by the multivibrator 14, a pulse duration control circuit 19 is connected thereto. As will be described in detail hereinafter, this circuit functions to control a timing circuit of the multivibrator 14, in such fashion as to obtain the proper respective durations of horizontal, equalizing and vertical pulses.

The pulse duration control circuit 19 is controlled by low frequency signals developed at output terminals 20 and 21 of a frequency divider and 60 cycle control signal generator 22. The signal developed at terminal 20 is herein referred to as a "9H" signal, which is shown graphically in FIGURE 1 as indicated by reference numeral 23, and which is "on" for a three line interval, then "off" for a three line interval, and then "on" again for a three line interval. This 9H signal, applied to the pulse duration control circuit 19, so controls the one-shot sync multivibrator 14 as to cause generation of the equalizing pulses of short duration.

At terminal 21 of the frequency divider and 60 cycle control signal generator 22, a signal is developed which is illustrated graphically by reference numeral 24 in FIGURE 1, this signal being herein referred to as a "3H" signal, being on for a three line interval, and off the remainder of the time. This 3H signal, applied to the pulse duration control circuit 19, causes the one-shot sync multivibrator 14 to generate the vertical synchronizing pulses of longer duration.

It should be noted that the input of the frequency divider and 60 cycle control signal generator 22 is connected to the delay multivibrator 16, as is required to properly synchronize the circuit operation.

It may also be noted that the 3H signal is applied to a frequency control circuit 25, which compares the phase or frequency of the 3H signal with a 60 cycle reference signal, and so controls the oscillator 17 as to maintain the frequency of the control signal equal to the frequency of the reference signal. This frequency control circuit forms no part of the present invention, and is not herein illustrated in detail. It may also be noted that in place of a frequency control circuit, the oscillator 17 may be self-controlled or stabilized by a crystal, if desired.

A 31,500 c.p.s. signal is applied from the delay multivibrator to a 15.75 k.c. pulse generator 26 which is connected through a phase inverter 27 to an "OR" circuit 28. The "OR" circuit 28 is also connected to terminals 20 and 21 of the control signal generator 22. The "OR" circuit 28, in turn, is connected to the gate circuit 15.

In operation, the "OR" circuit 28 functions to produce a negative output signal when either the 9H signal from terminal 20, or the 3H signal from terminal 21, or the 15,750 c.p.s. signal from the phase inverter 27 is of positive polarity. Thus a signal is applied to the gate circuit 15 having a form as illustrated graphically in FIGURE 1 and as indicated by reference numeral 29. When this signal is negative, the gate circuit 15 can function to generate triggering signals in response to the 31.5 k.c. square wave signal applied from the delay multivibrator 16, such being indicated by reference numeral 30 in FIGURE 1.

In addition to the composite synchronizing signal, the generator 10 also functions to generate a composite blanking signal at a terminal 31, the form of this signal being shown graphically in FIGURE 1, as indicated by reference numeral 32. This composite blanking signal includes horizontal blanking pulses which are of greater duration than the horizontal synchronizing pulses, and which start ahead of and finish after the horizontal synchronizing pulses. The composite blanking signal also includes a vertical blanking pulse which is preferably of substantially greater duration than the complete vertical synchronizing signal. As illustrated, the vertical blanking pulse has a duration equal to the duration of 15 horizontal lines.

The blanking output terminal 31 is connected to an output stage 33 having an input connected to a blanking multivibrator 34. A control signal is applied to the blanking multivibrator 34 from the 15.75 kc. pulse generator 26, the form of this signal being shown graphically in FIGURE 1, as indicated by the reference numeral 35. This signal normally causes the blanking multivibrator to generate the horizontal blanking pulses. At intervals of 1/60 of a second, however, a signal is applied from an "OR" circuit 36, to cause the blanking multivibrator 34 to generate the vertical blanking pulse of greater duration.

The "OR" circuit 36 is connected to output terminals 20 and 21 of the control signal generator 22 and also to another terminal 37 of the control signal generator 22. The signal at the terminal 37 starts or is "on" at the end of the 9H signal from terminal 20, and has a duration equal to the time required to trace six horizontal lines. This signal is illustrated graphically in FIGURE 1, as indicated by reference numeral 38, and is herein referred to as the "6H" signal.

In the operation of the "OR" circuit 36, a control signal is applied to the blanking multivibrator 34 when either the signal from terminal 20, or the signal from terminal 21, or the signal from 37 is of positive polarity. Thus this signal has a duration of 15 horizontal lines, and is shown graphically in FIGURE 1, as indicated by reference numeral 39.

The generator 10 also has output terminals 40 and 41 at which horizontal and vertical camera drive signals are developed, such signals being shown graphically in FIGURE 1 as indicated by reference numerals 42 and 43. These signals are applied to the sweep circuits of the camera tube to initiate operation thereof.

The horizontal drive output terminal 40 is connected to an output stage 44 having an input connected to the output of a horizontal drive multivibrator 45, preferably a monostable multivibrator having an input connected to the output of the 15.75 kc. pulse generator 26.

The vertical drive output terminal 41 is connected to an output stage 46 having an input connected to a vertical drive multivibrator, which is also preferably of the monostable type, and has an input connected to the terminal 21 of the control signal generator 22.

*Frequency divider and control signal generator 22 (FIG. 2)*

Figure 2:
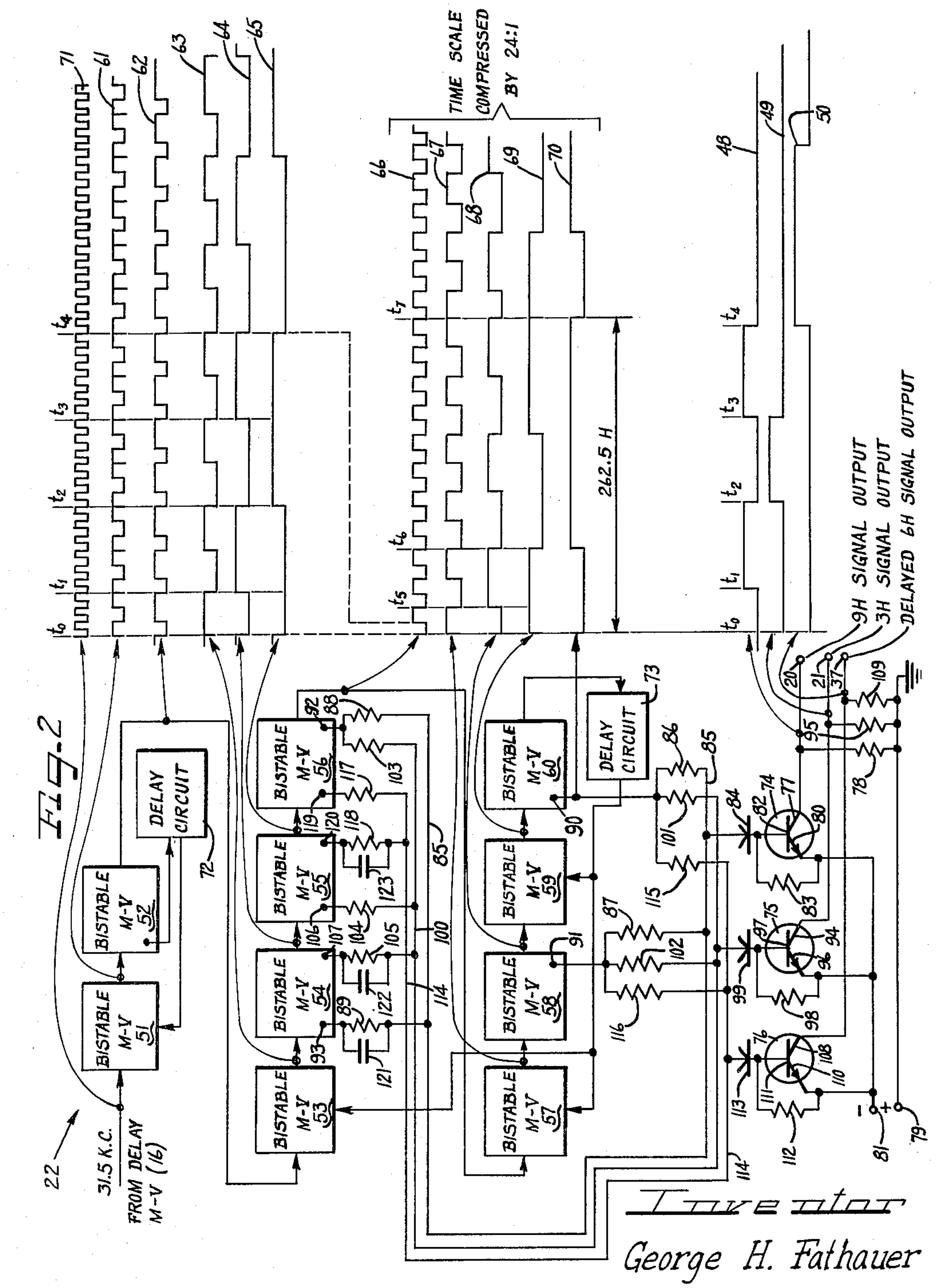
FIGURE 2 is a combined block and schematic diagram of the frequency divider and 60 cycle control signal generator of the circuit of FIGURE 1, the signals at various points of the circuit being illustrated graphically.

FIGURE 2 illustrates the frequency divider and 60 cycle control signal generator. The left-hand portion of this figure is a block and circuit diagram of the control signal generator, and the wave forms of signals at various points of the circuit are illustrated graphically in the right-hand portion of FIGURE 2.

As described above in connection with FIGURE 1, the control signal generator 22 has output terminals 20, 21 and 37, at which 9H, 3H and delayed 6H signals are produced, these signals being illustrated graphically in the lower right-hand portion of FIGURE 2, as indicated by reference numerals 48, 49 and 50. These signals are repeated at intervals of 1/60 of a second and must be properly synchronized with the triggering signals applied through the gate circuit 15 to the one-shot sync multivibrator 14.

The control signal generator 22 comprises ten bistable multivibrators 51–60 connected in cascade, the output signals therefrom being illustrated graphically at the right, as indicated by reference numerals 61–70, respectively.

The 31.5 kc. signal is applied to the first stage 51 from the delay multivibrator 16, the form of this signal being illustrated graphically at the upper right of FIGURE 2, as indicated by reference numeral 71.

The first two bistable stages 51 and 52 would normally operate to produce an output frequency equal to one-fourth the input frequency. However, a delay circuit 72 is connected to the ouput of the second bistable multivibrator 52 and feeds back a triggering signal to the first stage 51, after a slight delay. This results in a divide-by-three operation, so that the output frequency from the second bistable multivibrator stage 52 is equal to 10,500 c.p.s. The circuits of the stages 51 and 52 and the delay circuit 72 are illustrated in detail in FIGURE 3, and their operation will be explained more in detail hereinafter.

The last eight stages 53–60 would normally function to perfor a divide by 256 operation. However, a delay circuit 73 is connected to the output of the final stage 60, and supplies delayed signals back to the stages 53, 57 and 59, the result being that the last eight stages 53–60 function as a divide by 175 chain. Thus the output frequency of the final stage is equal to 60 cycles per second.

An important feature of this invention is in the generation of a low frequency control signal by use of a coincidence circuit having a plurality of inputs connected directly to stages of the frequency divider chain. As shown in FIGURE 2, three coincidence circuits are provided for generating the 9H signal, the 3H signal and the delayed 6H signal, such circuits respectively including transistors 74, 75 and 76.

The transistor 74 has a collector 77 connected to the 9H output terminal 20 and also through a resistor 78 to ground, which is connected to a terminal 79 to be connected to the positive terminal of a direct current source. The transistor 74 has an emitter 80 connected to a terminal 81 to be connected to the negative terminal of the direct current source, and a base 82 connected through a resistor 83 to the emitter 80 and also through a diode 84 to a connection line 85. The line 85 is connected through resistors 86, 87, 88 and 89 to output terminals 90, 91, 92 and 93 of the stages 60, 58, 56 and 54, respectively.

The transistor 75 similary has a collector 94 connected to the 3H output signal 21 and also through a resistor 95 to ground and the terminal 79; an emitter 96 connected to the negative terminal 81; and a base 97 connected through a resistor 98 to the emitter 96 and also through a diode 99 to a line 100 which is connected through resistors 101–105 to output terminals 90, 91, 92, 106 and 107 of the stages 60, 58, 56, 55 and 54, respectively.

The transistor 76 similarly has a collector 108 connected to the delayed 6H output terminal 37 and through resistor 109 to ground and the positive terminal 79; an emitter 110 connected to the terminal 81; and a base 111 connected through resistor 112 to the emitter 110 and also through diode 113 to a line 114 which is connected through resistors 115, 116, 117 and 118 to output terminals 90, 91, 119 and 120 of the stages 60, 58, 56 and 55, respectively.

Capacitors 121, 122 and 123 are connected across the resistors 89, 105 and 118, respectively.

The operation of these circuits will be explained in detail after first explaining the construction of the bistable multivibrator stages in connection with FIGURE 3. However, it may here be noted that each of the transistors 74, 75 and 76 is normally maintained in a conducting state, as long as there is a positive output signal at any one of the bistable multivibrator output terminals to which that coincidence circuit is connected, so that the terminals 20, 21 and 37 are normally effectively connected to the negative terminal 81. However, when all of the output signals of the frequency divider stages which are connected to one of the coincidence circuits are negative, the transistor of that coincident circuit will not conduct, and the associated output terminal will rise in a positive direction toward ground potential. In this way output signals will be generated having wave forms as indicated by reference numerals 48, 49 and 50 in FIGURE 2.

Figure 3:
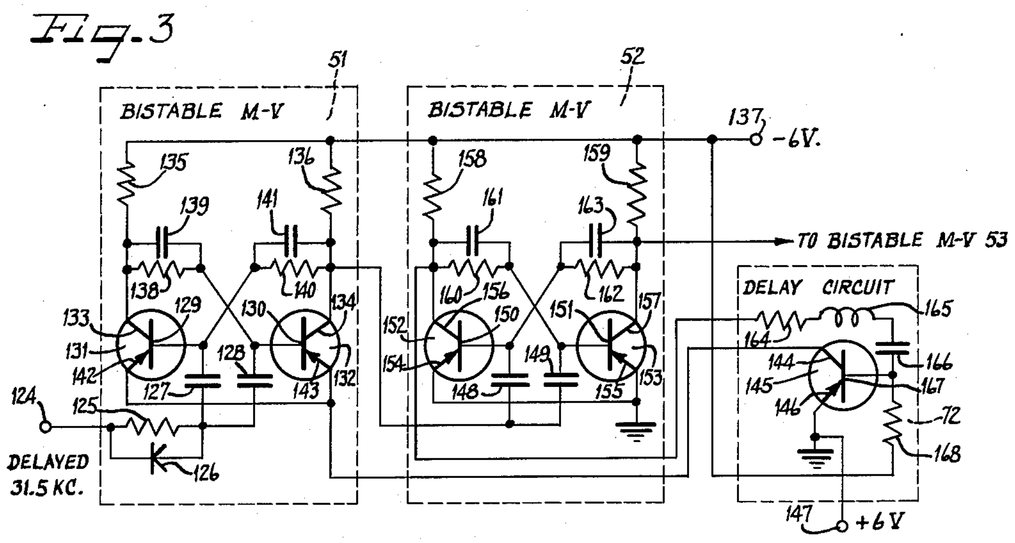
FIGURE 3 is a schematic diagram of a portion of the frequency divider circuit illustrated in block form in FIGURE 2.

Referring to FIGURE 3, the circuits of the first two bistable multivibrator stages 51 and 52, and also the delay circuit 72, are illustrated in detail. An input terminal 124, which receives a 31.5 kc. signal from the delay multivibrator 16, is connected through the parallel combination of a resistor 125 and a diode 126 to a junction point connected through capacitors 127 and 128 to base electrodes 129 and 130 of transistors 131 and 132 having collector electrodes 133 and 134 connected through resistors 135 and 136 to a terminal 137 to be connected to the negative terminal of a direct current supply, such as a six bolt battery. The collector 133 of the transistor 131 is connected to the base electrode 130 of the transistor 132 through the parallel combination of a resistor 138 and a capacitor 139. The collector 134 of the transistor 132 is connected to the base 129 of the transistor 131 through the parallel combination of a resistor 140 and a capacitor 141.

The transistors 131 and 132 have emitters 142 and 143 connected together and to the collector 144 of a transistor 145 in the delay circuit 72 having an emitter 146 connected to ground and also to a terminal 147 to be connected to the positive terminal of the direct current supply having its negative terminal connected to the terminal 137.

An output is taken from the collector 134 of the transistor 132 which is connected through capacitors 148 and 149 to base electrodes 150 and 151 of transistors 152 and 153 in the second bistable multivibrator stage 52. The transistors 152 and 153 have emitters 154 and 155 connected together to ground, and collectors 156 and 157 connected through resistors 158 and 159 to the negative power supply terminal 137. The collector 156 is connected to the base 151 through the parallel combination of a resistor 160 and a capacitor 161, and the collector 157 is connected to the base 150 through the parallel combination of a resistor 162 and a capacitor 163.

An output connection is made to the collector 157 of the transistor 153, which is connected to the input of the third bistable multivibrator stage 53.

The collector 156 of the left-hand transistor 152 is connected through a resistor 164, an inductor 165 and a capacitor 166 to a base electrode 167 of the transistor 145, the base electrode 167 being also connected through a resistor 168 to the negative power supply terminal 137.

To illustrate the operation of this circuit, it may be assumed that the right-hand transistors 132 and 153 of the first and second frequency divider stages 51 and 52 are conducting, with the left-hand transistors 131 and 152 being non-conducting, by virtue of the cross-connections of the collectors and base electrodes. It may be noted that the transistor 145 in the delay circuit is normally conducting, the base 167 being connected through the resistor 168 to the negative terminal 137. At a time $t_0$, indicated in the graph of the right-hand portion of FIGURE 2, a negative-going signal is applied to the input terminal 124. This has no immediate effect on the right-hand transistor 130 of the first stage 51 because it is already conducting. However, the negative-going signal at time $t_0$ causes the base 129 of the left-hand transistor 131 of the first stage 51 to become negative relative to the emitter 142, to thus initiate conduction of the transistor 131. As current starts to flow through the transistor 131, the potential of the collector electrode 133 will move in a positive direction, and through the coupling afforded by resistor 138 and capacitor 139, the base 130 of the right-hand transistor 132 will move in a positive direction, to reduce current flow through the transistor 132. This will cause the collector 134 of the right-hand transistor 132 to move in a negative direction and, through the coupling afforded by resistor 140 and capacitor 141, the potential of the base 129 of the left-hand transistor 131 will move further in a negative direction.

Through this action, the transistor 131 will become highly conductive, and the right-hand transistor 132 will be cut off. Thus at time $t_0$, the potential of the collector 134 will change from a value approximately equal to ground potential, to the negative potential of the power supply terminal 137.

A negative-going signal is thus applied to the input of the second bistable multivibrator stage 52. Through an action the same as that described with respect to the first stage, the left-hand transistor 152 of the second stage will become highly conductive, and the right-hand transistor 153 will be cut off. Accordingly, the potential of the collector 157 will move in a negative direction from a potential approximately equal to ground potential to a potential approximately equal to that of the negative terminal 137.

At the same time, the potential of the collector 156 will move in a positive direction, from a potential approximately equal to that of the negative terminal 137 to ground potential. This positive-going signal is applied to through elements 164–166 to base 167 of transistor 145 in delay circuit 72, and after a certain time delay, the current in circuit 164–166 will build up to a valve sufficient to momentarily cut-off current flow through transistor 145. This time delay is of the order of ¼ cycle at the resonant frequency of the oscillatory circuit defined by inductor 165 and capacitor 166.

When current flow through the transistor 145 is thus cut-off or reduced, the current flow through the left-hand transistor 131 of the first stage 51 will likewise be reduced while the potential of the emitter 143 of the right-hand transistor 132 will move in a negative direction to tend to start conduction through the right-hand transistor 132 will reduce conduction through the left-hand transistor 131. The effect will be a switching action in the first stage, with the right-hand transistor 132 being again rendered conductive, and with the left-hand transistor 131 being again rendered non-conductive. Thus the original condition will be obtained in the first stage, at a time shortly after time $t_0$. The output from the first stage may thus be a short negative pulse, as diagrammatically illustrated in the wave form 61 in FIGURE 2.

When the signal at the input terminal 124 moves in a positive direction, no effect will be produced. However, when the signal again moves in a negative direction, switching will take place in the first stage, to cause the left-hand transistor 131 to conduct and the right-hand transistor 132 to be cut-off. This will apply a negative-going signal to the input of the second stage, to cause the left-hand transistor 152 to be cut-off and to cause high conduction through the right-hand transistor 153, to thus restore the original condition in that circuit. At this time, a negative-going signal will be applied to the delay circuit but with no immediate effect, oscillations in circuit 164–166 being insufficient to overcome the forward bias supplied to transistor 145. In this connection, the time constant of elements 165, 166 is short compared to the duration of the negative portion of the signal applied to the delay circuit, so that practically there is no current flowing just prior to the application of a positive-going signal.

When the next negative-going signal is applied at the input terminal 124 (the second negative-going signal after time $t_0$), a switching action will again take place in the first stage 51 but without any action in the second stage 52. Each of the circuits 51, 52 and 72 will then be in their original condition and when the next negative-going signal is applied at the input terminal 124 (the third negative-going signal after time $t_0$), the cycle of action as above described will be repeated.

It may thus be perceived that the output signals of the first and second stages 51 and 52 will be illustrated graphically in FIGURE 2, and as indicated by reference numerals 61 and 62. It may further be noted that the repetition rate of the output signal from the second stage 52 is equal to one-third the repetition rate (31.5 kc.) of the applied input signal.

Each of the bistable multivibrator stages 53, 57 and 59 has a circuit identical to that of the first stage 51, the delay circuit 73 is identical to the delay circuit 72, and the connection between the delay circuit 73 and stages 53, 57 and 59 is identical to the connection between delay circuit 72 and the first stage 51. Each of the stages 54, 55, 56, 58 and 60 has a circuit identical to that of the second stage 52.

By following through the actions of all of these stages in a manner similar to the analysis of the first two stages as described above, it will be found that output signals will be produced as graphically illustrated in the right-hand portion of FIGURE 2, and as indicated by reference numerals 62–70.

With particular reference to the output signal from the fourth stage 54, it will be noted that it moves in a negative direction at time $t_0$, then back in a positive direction at a time $t_1$ coincident with the third negative-going input signal after time $t_0$. At times $t_2$, $t_3$ and $t_4$, respectively coincident with the 9th, 15th and 21st negative-going input signals after time $t_0$, the output signal from the fourth stage 54 successively moves negative, positive and negative.

The output signal from the fifth stage 55 swings negative at time $t_0$, positive at time $t_2$ and then negative again at time $t_4$.

The output signal from the sixth multivibrator stage 56, as indicated by reference numeral 66, swings negative at time $t_0$, then positive at time $t_4$ and then negative again at a time $t_5$ coincident with the 45th negative-going signal after time $t_0$. The signal from the 8th multivibrator stage 58, as indicated by reference numeral 68, swings negative at time $t_0$, then positive at time $t_5$ and then negative again at a time $t_6$ coincident with the 141st negative-going signal after time $t_0$. The signal from the 10th and final stage 60, as indicated by reference numeral 70, swings negative at time $t_0$ then positive at time $t_6$ and then negative again at a time $t_7$ coincident with the 525th negative-going signal after time $t_0$. The cycle is then repeated. Thus $t_7$ is the $t_0$ for the succeeding cycle.

Concerning the operation of the coincident circuit including transistor 74 used to develop the 9H signal at terminal 20, it is again noted that the base 82 is connected through the diode 84 to line 85 connected through resistors to output terminals 90, 91, 92 and 93 of the 10th, 8th, 6th and 4th multivibrator stages 60, 58, 56 and 54, respectively. When anyone of such output signals is positive, with respect to the negative power supply terminal 81, the transistor 74 will conduct so that the output terminal 20 will be at substantially the same potential as the negative power supply terminal 81. However, when all of the output signals are negative, i.e., at the potential of the negative power supply terminal 81, the transistor 74 will not conduct and the potential of the output terminal 20 will rise in a positive direction toward ground, which is connected to the positive terminal of the power supply.

The output terminal 93 of the 4th multivibrator stage 54, is connected to a point of that circuit at which a wave form is developed of inverted form, as compared to the wave form 64 as illustrated. In particular, the multivibrator stage 54 is identical to the second multivibrator stage 52 as illustrated in detail in FIGURE 3, and the output terminal 93 is connected to the collector of the left-hand transistor, corresponding to the collector 156 of the transistor 152 in the second stage.

From time $t_0$ to time $t_1$, the output of the 4th multivibrator stage 54, taken at output terminal 93, is of positive polarity and is applied through resistor 89, diode 84 to the base 82 of the transistor 74 so that the transistor 74 will conduct and the output terminal 20 will be at substantially the same potential as the negative power terminal 81.

From time $t_1$ to time $t_2$, the potentials of all of the terminals connected to the transistor 74 will be negative, the transistor will not conduct and hence the potential of the output terminal 20 will rise in a positive direction as indicated on the wave form 48.

From time $t_2$ to time $t_3$, the potential of the output terminal 93 of the 4th multivibrator 54 will again be positive, to cause conduction of the transistor 74 and hence place the terminal 20 at a negative potential.

From time $t_3$ to time $t_4$ all of the output terminals 90–93 will again be negative, to prevent conduction through the transistor 74, and hence the potential of the output terminal 20 will again rise in a positive direction.

From time $t_4$ to time $t_7$, one or more of the output terminals 90–93 will be positive to thus produce a negative output signal. Thus the output terminal 92 of the 6th stage 56 will be positive from time $t_4$ to time $t_5$, the output terminal 91 of the 8th multivibrator stage 58 will be positive from time $t_5$ to time $t_6$, and the output terminal 90 of the 10th multivibrator stage will be positive from time $t_6$ to time $t_7$.

It will thus be appreciated that an output signal is produced at the terminal 20, as diagrammatically indicated by reference numeral 48 in FIGURE 2, and also by reference numeral 23 in FIGURE 1.

The 3H and delayed 6H signals are produced in the same fashion as the 9H signal as described above, and it is believed unnecessary to make a detailed explanation of their generation. It may, however, be noted that terminals 106 and 119 of the 5th and 6th multivibrator stages 55 and 56 are connected to circuit points such as to produce wave forms inverted with respect to the wave forms 65 and 66 as illustrated. The wave forms at terminals 107 and 120, as well as 92, 91 and 90, are of the same form as illustrated and indicated by reference numerals 64, 65, 66, and 70, respectively.

It may be possible, of course, to modify the circuit of the frequency divider and control signal generator 22 in various ways as, for example, by using different methods of applying delayed feedback signals, or by using frequency divider stages to divide by factors greater than two. In any case, however, it is important to have one stage, such as stage 54 of the illustrated system, operated at a rate equal to the reciprocal of the duration of each train of vertical pulses and to produce the vertical control signal, the coincidence circuit should be connected to that stage, the final stage and at least one other stage intermediate the one stage and the final stage. To develop the equalizing control signal, the coincidence circuit should be connected to the final stage, a stage operated at a certain rate equal to the reciprocal of the train duration and another stage operated at a rate equal to said certain rate divided by a factor at least equal to three and not greater than four.

It should further be noted that the use of the binary system is of considerable importance in obtaining stability of operation, and it is also important that transistors be used in both the frequency divider and the coincidence circuit. With this system, output signals are produced from each frequency divider stage cyclically shifted between one value and another value respectively equal to the potentials of the terminals of the common direct current supply. Thus the direct coupling to the coincidence circuits may be made, and the circuit is very stable in operation without requiring any precision or adjustable components.

Figure 4:
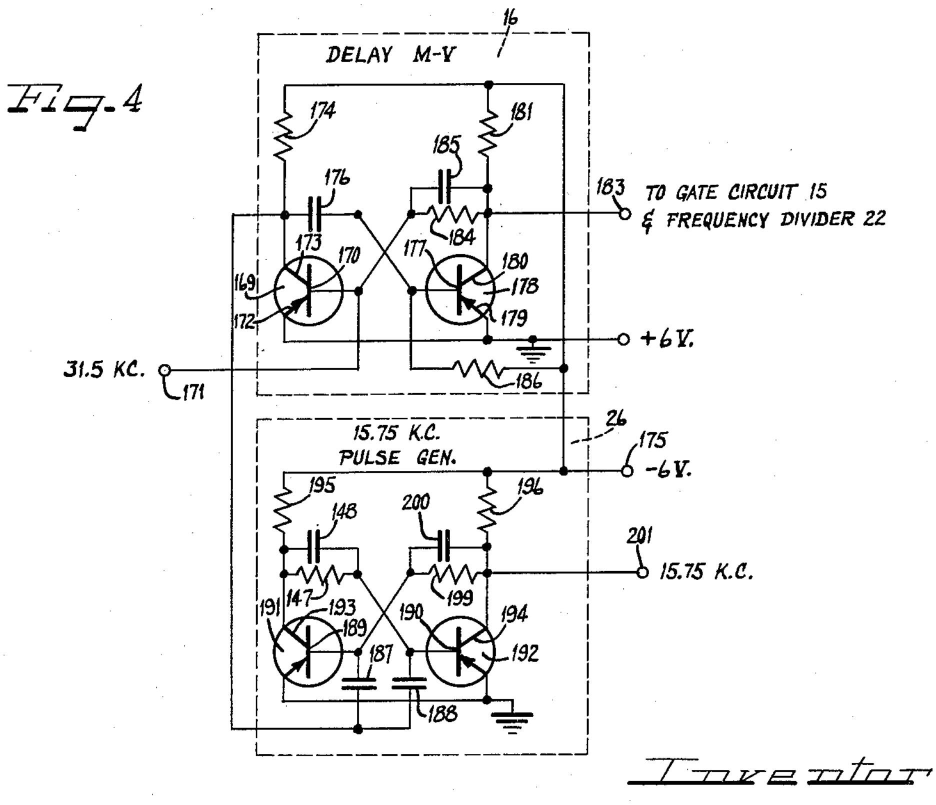
FIGURE 4 is a circuit diagram of the delay multivibrator and 15.75 kc. pulse generator illustrated in block form in FIGURE 1.

*Delay multivibrator 16 and 15.75 kc. pulse generator 26 (FIG. 4)*

The delay multivibrator 16 comprises a transistor 169 having a base 170 connected to an input terminal 171, an emitter 172 connected to ground, and a collector 173 connected through a resistor 174 to a terminal 175 for connection to the negative terminal of a power supply, such as a 6 volt battery. The collector 173 is connected through a capacitor 176 to the base 177 of a second transistor 178 having an emitter 179 connected to ground and a collector 180 connected through a resistor 181 to the negative power supply terminal 175. The collector 180 is also connected to an output terminal 183 and through the parallel combination of a resistor 184 and a capacitor 185 to the base 170 of the transistor 169.

A resistor 186 connects the base 177 of the right-hand transistor 178 to the negative power supply terminal 175, so that the transistor 178 normally conducts. When a negative-going signal is applied to the input terminal 171, the transistor 169 starts to conduct to cause the potential of the collector 173 to move in a positive direction toward ground and through the capacitor 176 to cause the base 177 to likewise move in a positive direction, to thus decrease current flow through the right-hand transistor 178, to thus cause the potential of the collector 180 to move in a negative direction and thus to further increase the negative bias of the base 170, additional current flow through the transistor 169, etc. Thus the transistor 169 will be rendered conductive, and the transistor 178 will be cut off. The charge of the capacitor 176 may then change relatively slowly through current flow through the resistor 186, until the potential of the base 177 is below ground potential. The right-transistor 178 will then again conduct, and the left-hand transistor 169 will be again cut-off, until another negative-going signal is applied to the input terminal 171 from the 31.5 k.c. oscillator 17.

Accordingly, the negative pulse is developed at the output terminal 183 in response to each negative-going signal applied at terminal 171 from the 31.5 k.c. oscillator 17, the duration of the pulse being determined by the time constant of the series circuit of capacitor 176 and resistor 186.

At the same time that a negative pulse is developed at the output terminal 183, a positive pulse is developed at the collector 173 of the transistor 169. This pulse is applied through capacitors 187 and 188 to base electrodes 189 and 190 of transistors 191 and 192 in a bistable multivibrator circuit forming the 15.75 k.c. pulse generator 26, and the negative-going trailing edge of each such pulse causes the multivibrator to switch from one condition to the other. It should be noted that the circuit of the 15.75 k.c. pulse generator 26 is essentially the same as that of the bistable multivibrator 52 of the frequency divider chain, illustrated in FIGURE 3, and operates in the same fashion. Thus the transistors 191 and 192 have emitters connected to ground, and collectors 193 and 194 connected through resistors 195 and 196 to the negative power supply terminal 175, with the parallel combination of a resistor 197 and a capacitor 198 being connected between the collector 193 and the base 190, and with the parallel combination of a resistor 189 and a capacitor 200 being connected between the collector 194 and the base 189.

The collector 194 is connected to an output terminal 201, at which a 15.75 k.c. square wave signal is thus developed, this signal being illustrated graphically in FIGURE 1 as indicated by reference numeral 35, and being applied to the phase inverter 27, the blanking multivibrator 34, and the horizontal drive multivibrator 45, as described above.

*Composite synchronizing signal generator (FIG. 5)*

The negative pulse signal developed at the output terminal 183 of the delay multivibrator 16 is applied to terminal 202, as shown on FIGURE 5. Terminal 202 is connected through a resistor 203, and inductor 204 and a capacitor 205 to the base 206 of a transistor 207 in the gate circuit 15. The transistor 207 has an emitter 208 connected to ground and a collector 209 connected through a resistor 210 to a collector 211 of a transistor 212 in the "OR" circuit 28. The transistor 212 has an emitter 213 connected to a terminal 14 for connection to the negative terminal of a power supply, and a base 215 to which signals are applied at certain times, to render the transistor 212 conductive and thus effectively connect the resistor 210 to the negative power supply terminal 214. The application of signals to the base 215 will be described more in detail hereinafter.

The base 206 of the gate circuit transistor 207 is connected through a resistor 216 to the negative power supply terminal 214, so that the transistor 207 is normally biased toward conduction. When a negative square wave pulse signal is applied to the terminal 202 from the delay multivibrator 16, it will have no immediate effect since the gate circuit transistor 207 is already biased toward conduction through the resistor 216 and any oscillations in circuit 203–205 will be insufficient to overcome the forward bias. Upon the elapse of a certain time delay after the positive-going trailing edge of the negative square wave pulse signal, current will build up in circuit 203–205 to a value sufficient to overcome the forward bias and momentarily cut-off transistor 207. This time delay is of the order of ¼ cycle at the resonant frequency of the oscillatory circuit defined by inductor 204 and capacitor 205.

When current through transistor 207 is momentarily cut-off, potential of the collector 209 will then move in a negative direction toward the potential of the negative power supply terminal 214 (assuming the transistor 212 of the "OR" circuit is then conductive) and thus a negative pulse signal is developed at the collector 209 of the gate circuit transistor 207.

This negative pulse signal developed by the gate circuit 15 is applied through a capacitor 217 to the base 218 of a transistor 219 in the one-shot or monostable sync multivibrator 14, to cause generation of a pulse by that circuit.

The transistor 219 has an emitter 220 connected to ground and a collector 221 connected through a resistor 222 to the negative power supply terminal 214. The collector 221 is also connected through a capacitor 223 to the base 224 of a second transistor 225. The transistor 225 has an emitter connected to ground and a collector 226 connected to the output stage 13 and also through a resistor 227 to the negative power supply terminal 214. The collector 226 is additionally connected through the parallel combination of a resistor 228 and a capacitor 229 to the base 218 of the left-hand transistor 219.

In operation, the base 224 of the right-hand transistor 225 is normally at a negative potential, by virtue of a connection through resistor 230 to the negative power supply terminal 214. The collector 226 is thus at substantially ground potential, and the left-hand transistor 219 is maintained non-conductive, through the connection of collector 226 to the base 218 through resistor 228.

When a negative pulse signal is applied from gate circuit 15 through capacitor 217 to the base 218, the transistor 219 will start to conduct. This will cause the potential of the collector 221 to move in a positive direction toward ground potential and, through the capacitor 223, the potential of the base 224 of the right-hand transistor 225 will move in a positive direction to reduce conduction through the transistor 225. This, in turn, will cause the potential of the collector 226 to move in a negative direction and will cause the potential of the base 218 to move further in a negative direction. In a very short time, the left-hand transistor 219 will be highly conductive, and the right-hand transistor 225 will be cut-off.

By virtue of a charge of the capacitor 223, the potential of the base 224 will then be at a positive value relative to ground. This potential will then move at a certain rate toward the potential of the negative power supply terminal 14, by changing charge of capacitor 223 and current flow through the resistor 230. When the potential of the base 224 moves to a value slightly less than ground potential, the transistor 225 will again start to conduct and in a very short interval time, the transistor 225 will be highly conductive and the transistor 219 will be cut-off.

Thus in response to a negative triggering pulse applied from the gate circuit 15, a negative output pulse of a certain duration will be produced at the collector 226. This negative output pulse is applied through resistor 231 to the base 232 of a transistor 233 in the output stage 13, the transistor 233 having a collector 234 connected to the negative power supply terminal 214 and an emitter 235 connected to the composite synchronizing pulse output terminal 12. This output circuit is an emitter-follower circuit, which provides a lower output impedance than would be available at the output of the synchronizing pulse multivibrator 14, and also isolates the load circuit from the synchronizing pulse multivibrator.

The duration of the pulse generated by the one-shot sync multivibrator 14 is dependent on the value of the capacitor 223, and the effective resistance between the base 224 and the negative power supply terminal 214. According to an important feature of this invention, the effective resistance between the base 224 and the negative power supply terminal 214 is automatically changed at proper times to obtain horizontal synchronizing pulses, and equalizing pulses of the required duration. This is effected by means of the pulse duration control circuit 19, which comprises a pair of transistors 236 and 237.

The transistor 236 has a collector 238 connected through a resistor 239 to the base 224, a base 240 connected through a resistor 241 to ground and through a resistor 242 to the negative power supply terminal 214, and an emitter 243 connected to a terminal 244, which is connected to the 3H output terminal 21 of the frequency divider and 60 cycle control signal generator 22.

In operation, the terminal 244 is normally at a potential substantially equal to the potential of the negative power supply terminal and the base 240 is at a potential intermediate ground potential and the potential of the negative power supply terminal, so that the transistor 236 is normally conductive and the resistor 239 is effectively connected in parallel with the resistor 230, between the base 224 of the one-shot sync multivibrator transistor 225 and the negative power supply terminal. The one-shot sync multivibrator 14 then generates pulses having a duration determined by the value of the capacitor 223 and the values of the resistors 230 and 239 in parallel. This pulse duration is equal to the required pulse duration of the horizontal synchronizing pulses.

When a positive signal is applied to the terminal 244 during the synchronizing pulse interval, the transistor 236 will be cut-off so that the effective resistance between base 224 and the negative power supply terminal will be equal to the resistance of resistor 230. Thus a pulse of greater duration will be generated by the one-shot sync multivibrator 14, this duration being that required for the vertical synchronizing pulses.

To generate the short-duration equalizing pulses, another resistor 245 is effectively connected in parallel with resistors 230 and 239. This is effected by the transistor 237 having a collector 246 connected to resistor 245, an emitter 247 connected to the negative power supply terminal, and a base 248 connected through resistor 249 to the negative power supply terminal and through resistor 250 to a terminal 251 which is connected to the 9H output terminal 20 of the frequency divider and control signal generator 22.

The transistor 237 is normally non-conductive, but is rendered conductive during the equalizing pulse intervals by the signal applied to terminal 251 from the output terminal 20 of the control signal generator 22.

The transistor 212 of the "OR" circuit 28 is rendered conductive, to render the gate circuit 15 operative, when a positive signal is applied to the base 11, either from the 3H terminal 244 through resistor 252, or from the 9H terminal 251 through resistor 253, or from the phase inverter 27 through a resistor 254. Thus, as suggested above in connection with FIGURE 1, a control signal is applied to the gate circuit 15 having a form as indicated by reference numeral 29.

A resistor 255 is connected between base 215 and the negative terminal 214.

The phase inverter 27 comprises a transistor 256 having an emitter connected to the negative power supply terminal 214, a collector 257 connected to the resistor 254 and also through resistor 258 to ground, and a base 259 connected to the negative power supply terminal 214 through a resistor 260, and also through a capacitor 261 to a terminal 262, for connection to the output terminal 201 of the 15.75 kc. pulse generator 26. As will be described hereinafter, the horizontal drive multivibrator 45, as well as the blanking multivibrator 34, are triggered by negative-going signals from the 15.75 kc. pulse generator, at which time the phase inverter transistor 256 is rendered non-conductive, to apply a positive signal to the "OR" circuit 28, to thus render the gate circuit 15 operative. Thus the phase inverter 27 serves to produce the proper phase of signal to synchronize the generation of the horizontal synchronizing pulses with the generation of the horizontal drive and horizontal blanking pulses.

It should also be observed that the negative-going signals from the 15.75 kc. generator, which initiate operation of the blanking multivibrator 34, are coincident with the trailing edges of the negative square wave pulses developed by the delay multivibrator 16 and that the gate circuit 15 develops the negative triggering pulses at a time interval following the trailing edges of the pulses from the delay in multivibrator 16. Thus the operation of the sync multivibrator 14 is delayed for a certain time interval after operation of the blanking multivibrator. By this means the "front porch" delay is obtained. The magnitude of the delay is approximately equal to the duration of one cycle at the resonant frequency of the oscillatory circuit defined by inductor 204 and capacitor 205, and it will be appreciated that such can be accurately controlled.

It may further be noted that the operation of the frequency divider and control signal generator 22 is controlled by negative-going signals from the delay multivibrator 16, the result being that the leading edges of the 3H and 9H control signals precede the triggering signals applied to the composite synchronizing pulse multivibrator 14, as well as the triggering signals applied to the blanking multivibrator 34 and horizontal drive multivibrator 45. This insures completion of the operation of the pulse duration control and "OR" circuits, prior to the triggering pulses. The amount of this delay is, of course, dependent upon the duration of the pulses generated by the delay multivibrator 16.

With respect to the one-shot synchronizing pulse multivibrator 14 and the pulse duration control circuit 19, it is important to note that the transistors should have a negligible resistance, when conducting, relative to the resistances in series therewith, so that the operation of the circuits will not be affected by normal variations in the operation of the transistors, and to permit considerable tolerance in the values of most components. In this connection, it is to be noted that the only precision components required are the capacitor 223 and the resistors 230, 239 and 245 of the timing circuit of the multivibrator 14. All other components may have a 20% or greater tolerance.

*Blanking multivibrator 34 (FIG. 6)*

The 15.75 kc. signal developed at the output terminal 201 of the 15.75 kc. pulse generator 26 is applied to terminal 263, as shown in FIGURE 6, which is connected through a capacitor 264 to the base 265 of a transistor 266 in the blanking multivibrator 34. The transistor 266 has an emitter 267 connected to ground, the base 265 being also connected through a resistor 268 to ground. The transistor 266 has a collector 269 connected through resistor 270 to a terminal 271 for connection to the negative terminal of a power supply, the collector 269 being also connected to capacitor 272 to the base 273 of a transistor 274. The transistor 274 has an emitter 275 connected to ground and a collector 276 connected to output stage 33 and also through resistor 277 to the negative power supply terminal 271. The collector 276 is also connected through the parallel combination of a resistor 278 and a capacitor 279 to the base 265 of the transistor 266.

The base 273 is connected through a resistor 280 to a circuit point 281 connected through a resistor 282 to ground and also to the collector 283 of a transistor 284 having an emitter 285 connected to ground. The transistor 284 has a base 286 connected through resistor 287 to ground and also through a diode 288 and a resistor 289 to a circuit point 90 with a resistor 291 connected between circuit point 290 and base 286. Circuit point 290 is connected through a capacitor 292 to the negative power supply terminal and also to the collector 293 of a transistor 294 in the "OR" circuit 36, the transistor 294 having an emitter 295 connected to the negative power supply terminal 271, and a base 296 connected through resistors 297, 298 and 299 to terminals 300, 301 and 302, arranged to be connected to the 3H, 9H and 6H output terminals 21, 20 and 37, respectively, of the control signal generator 22. A capacitor 303 is connected across resistor 298. Resistor **296*a* connects base 296 to emitter 295**.

In operation, the multivibrator 34 normally generates a horizontal blanking pulse of predetermined duration in response to each negative-going signal applied at terminal 263 from the 15.75 kc. pulse generator 26. However, when a positive signal is applied at either the 3H terminal 300, or the 9H terminal 301, or the 6H terminal 302, the "OR" circuit functions to cause the blanking multivibrator 34 to generate a sustained pulse having a duration on the order of 15H, i.e., the time required for tracing of 15 horizontal lines.

In particular, the right-hand transistor 274 of the blanking multivibrator 34 is normally conducting, with the left-hand transistor 266 being normally non-conducting. When a negative-going signal is applied to the base 265 of the left-hand transistor, it becomes conductive, and the right-hand transistor 274 is cut-off. At this instant, the capacitor 272 will be charged at a polarity as indicated in FIGURE 6, to a value substantially equal to the power supply voltage. Thus with a six volt power supply, the base 273 of the right-hand transistor will be at a potential of plus six volts relative to ground. The transistor 284 is normally non-conducting and the potential of base 273 will then move in a negative direction toward the potential of the negative power supply terminal, by current flow through resistors 280 and 282. When this potential reaches a value slightly less than ground potential, the transistor 274 will begin to conduct and in a very short time will conduct heavily, with the left-hand transistor 266 being cut-off. Thus a negative pulse will be developed at the collector 276 of the right-hand transistor 274, the duration being dependent upon the values of the capacitor 272 and resistors 280 and 282. By this action, the horizontal blanking pulses are developed.

During the 15H interval, during which there is an output either from the 3H terminal 21, the 9H terminal 20 or the delayed 6H terminal 37 of the control signal generator 22, the transistor 294 of the "OR" circuit 36 will be rendered conductive, to apply a negative signal to the base 286 of the transistor 284. This causes conduction of the transistor 284, to effectively connect the circuit point 281 to ground. The following action will then take place. A negative-going pulse applied to the transistor 266 will cause it to conduct heavily and cause the right-hand transistor 274 to be cut-off, as described previously. The capacitor 272 will then begin to discharge. However, the potential of the base 273 will not move toward the potential of the negative power supply terminal but, instead, will move toward ground potential in an exponential fashion but will not reach ground potential to permit conduction of the transistor 274. Accordingly, during the 15H interval, the left-hand transistor 266 will remain in a conductive state, and the right-hand transistor 274 will remain non-conductive, so that the collector 276 will be substantially at the potential of the negative power supply terminal 271.

At the termination of the 15H interval, the transistor 284 will be again non-conductive, and the potential of the base 273 may then move toward the potential of the negative power supply terminal, to prevent conduction of the right-hand transistor 274, and to cause the left-hand transistor 266 to be cut-off until application of the next negative-going signal at the terminal 263.

It may be noted that the resistor 287 together with the diode 288 and resistors 289 and 291, also capacitor 292, operate as a pulse stretcher circuit, to provide continued operation for a short time interval after termination of the 15H signal.

The output stage 33 is similar to the output stage 13 above described and comprises a transistor 304 having a collector 305 connected to the negative power supply terminal 271, a base 306 connected through resistor 307 to the output of the blanking multivibrator 34, and an emitter 308 connected to the output terminal 31.

*Horizontal drive multivibrator (FIG. 6)*

The horizontal drive multivibrator 45 comprises a pair of transistors 309 and 310 having emitters 311 and 312 connected to ground, collectors 313 and 314 respectively connected through resistors 315 and 316 to a negative power supply terminal 317, and base electrodes 318 and 319. The base electrode 318 is connected through a resistor 319 to ground, through a resistor 320 to ground, through a capacitor 321 to the 15.75 kc. terminal 263, and through the parallel combination of a resistor 322 and a capacitor 323 to the collector 314 of the right-hand transistor 310. The base 319 of the right-hand transistor 310 is connected through a resistor 324 to the negative power supply terminal 317 and through a capacitor 325 to the collector 313 of the left-hand transistor 309.

In operation, the right-hand transistor 310 is normally conducting by virtue of the connection from the base 319 through resistor 324 to the negative power supply terminal 317, and the left-hand transistor 309 is normally non-conducting. When a negative-going signal is applied to the base 318 of the left-hand transistor from the terminal 263, the left-hand transistor 309 will become conductive and the right-hand transistor 310 will be cut-off. The capacitor 325 will then be so charged as to place the potential of the base 319 in a positive value relative to ground. This potential will then move toward the potential of the negative power supply terminal 317, through a change of charge of the capacitor 325 and current flow through the resistor 324, and when the potential reaches a value slightly less than ground potential, the right-hand transistor 310 will again conduct, and the left-hand transistor 309 will be again cut-off.

Thus a negative pulse is produced at the collector 314 in response to a negative-going signal from the input terminal 263, and the duration of the pulse will be determined essentially by the time constant of the combination of capacitor 325 and resistor 324. This time constant is, of course, so chosen as to obtain the required duration of the horizontal drive pulses.

The collector 314 of the right-hand transistor 310 is connected through transistor 326 to the base 327 of a transistor 328 in the output stage 44, the transistor 328 having a collector 329 connected to the negative power supply terminal 317, and having an emitter 330 connected to the output terminal 40. This operates as an emitter-follower stage, functioning in the same way as the composite synchronizing signal output stage 13 above described.

*Vertical drive multivibrator 47 (FIG. 6)*

The vertical drive multivibrator 47 comprises a pair of transistors 331 and 332 having emitters connected to ground, collectors 333 and 334 connected through resistors 335 and 336 to the negative power supply terminal 317 and base electrodes 337 and 338. The base 337 is connected through the parallel combination of resistor 339 and capacitor 340 to the collector 334, and the base 338 is connected through resistor 341 to the negative power supply terminal 317, and through capacitor 342 to the collector 333. The collector 333 is connected through resistor 343 and capacitor 344 to the 3H terminal 300 which, as indicated above, is connected to the output terminal 21 of the frequency divider and 60 cycle control signal generator 22.

The vertical drive multivibrator circuit functions in the same general manner as the horizontal drive multivibrator 45, the right-hand transistor 332 being normally conducting and the left-hand transistor 331 being normally non-conducting, the conductions being reversed on application of a triggering signal, for a time interval determined by the time constant of the circuit including resistor 341 and capacitor 342. There is a significant difference, however, in that the triggering signal is applied through capacitor 344 and resistor 343 to the collector 333 of the left-hand transistor 331. By virtue of this connection, the circuit will be triggered by a positive-going signal from the 3H terminal 300. Thus the start of the vertical drive pulse will coincide with the start of the vertical synchronizing pulse interval. It may be observed that the vertical drive pulse has a much greater duration than the horizontal drive pulses, and therefore the circuit of resistor 341 and capacitor 342 has a correspondingly long time constant.

The negative output pulse developed at the collector 334 of the right-hand transistor 332 is applied through resistor 345 to the base 346 of a transistor 347 in the output stage 46, the transistor 347 having a collector 348 connected to the negative power supply terminal and an emitter 349 connection to the output terminal 41. This circuit, like output stages 40, 33 and 13, functions as an emitter-follower circuit.

*Summary*

The basic features of operation of the generator 10 may be summarized as follows:

(1) Delay multivibrator 16 generates negative square wave pulses at the 31.5 kc. rate, indicated by reference numeral 30 in FIGURE 1.

(2) The leading edges of the negative square wave pulses from delay multivibrator 16 initiate operation of the frequency divider and 60 cycle control signal generator, to generate 9H, 3H and delayed 6H signals as indicated by reference numerals 23, 24 and 38 in FIGURE 1.

(3) Signals from delay multivibrator 16 are simultaneously applied to the 15.75 kc. pulse generator 26, to generate the signal 35 which controls the horizontal blanking multivibrator 34 and the horizontal drive multivibrator 45. The leading edges of the horizontal blanking and drive pulses are coincident with the positive-going trailing edges of alternate negative square wave pulses developed by delay multivibrator 16.

(4) A 15.75 k.c. signal and the 3H and 9H signals are applied to the "OR" circuit 28 which applies a control signal 29 to gate circuit 15 to cause generation of the negative triggering pulse signal 18 in response to the signal 30 from the delay multivibrator 16. The triggering pulses 18 are normally generated at the 15.75 kc. rate, for generation of the horizontal synchronizing pulses, but during the 9H interval are generated at the 31.5 kc. rate, for generation of the equalizing and vertical synchronizing pulses. Through operation of the oscillatory circuit 204, 205 in the input of delay circuit 15 (FIGURE 5), the triggering pulses are delayed with respect to the positive-going trailing edges of the negative pulses developed by delay multivibrator 16, and are hence delayed with respect to the leading edges of the horizontal blanking pulses, thus to provide the "front porch" delay.

(5) The one-shot sync multivibrator 14 generates a pulse in response to each negative triggering pulse applied from gate circuit 15. Normally, resistors 230 and 239 are connected in parallel in the timing circuit of multivibrator 14 (see FIGURE 5) to produce pulses having the required horizontal pulse duration. During the application of the 9H signal 23 to the pulse duration control circuit 19, transistor 237 operates to connect an additional resistor 245 in parallel with resistors 230 and 239, to produce the short duration equalizing pulses. During the application of the 3H signal 24, transistor 236 is rendered non-conductive and resistor 239 is disconnected, to effect production of the vertical synchronizing pulses of relatively long duration.

(6) The 9H, 3H and delay 6H signals are applied to "OR" circuit 36, to cause generation of a vertical blanking pulse of relatively long duration, at intervals of 1/60 of a second.

(7) The 3H signal 24 is applied to the vertical drive multivibrator 47, to effect generation of a vertical drive pulse as indicated by reference numeral 43.

Accordingly, the generator 10 develops horizontal and vertical drive signals, a composite blanking signal and a composite synchronizing signal, in which the pulses have the required durations and time relation. The use of the one-shot composite synchronizing signal multivibrator 14 together with the pulse duration control circuit 19 is of considerable importance, particularly with the transistors used in the manner as illustrated and described, in that the pulses are generated with a high degree of accuracy and with a minimum number of precision components. The only precision components required are those in the timing circuit of the one-shot multivibrator, and no adjustable components at all are required.

A further important feature resides in the control signal generator illustrated in FIGURES 2 and 3, in which the low frequency control signals are generated by the use of coincidence circuits, including transistors 74, 75 and 76, directly connected to stages of the frequency divider chain 51–60. With the construction as described and illustrated, highly stable operation is achieved, without however requiring any adjustable or precision components.

Other important features reside in the simplified circuits for obtaining the required time delays, such as the delay multivibrator 16, and the oscillatory circuit in the input of the gate circuit 15. No delay line is required.

By way of illustrative example, and not by way of limitation, the following values and types of components may be used.

| Reference numeral: | | Value |
|---|---|---|
| 78 | ohms | 2200 |
| 83 | do | 3300 |
| 86–89 | do | 47,000 |
| 95 | do | 2200 |
| 98 | do | 3900 |
| 101–105 | do | 47,000 |
| 109 | do | 2200 |
| 112 | do | 2700 |
| 115–118 | do | 47,000 |
| 121–123 | micro-microfarads | 47 |
| 125 | ohms | 68,000 |
| 127, 128 | micro-microfarads | 22 |
| 135, 136 | ohms | 4700 |
| 138 | do | 33,000 |
| 139 | micro-microfarads | 100 |
| 140 | ohms | 33,000 |
| 141 | micro-microfarads | 100 |
| 148, 149 | do | 22 |
| 158, 159 | ohms | 4700 |
| 160 | do | 33,000 |

| Reference numeral: | | Value |
|---|---|---|
| 161 | micro-microfarads | 100 |
| 162 | ohms | 33,000 |
| 163 | micro-microfarads | 100 |
| 164 | ohms | 1,000 |
| 165 | millihenries | 5 |
| 166 | micro-microfarads | 470 |
| 168 | ohms | 10,000 |
| 174 | do | 680 |
| 176 | micro-microfarads | 330 |
| 181 | ohms | 2200 |
| 184 | do | 22,000 |
| 185 | micro-microfarads | 220 |
| 186 | ohms | 22,000 |
| 187, 188 | micro-microfarads | 22 |
| 195–197 | ohms | 3300 |
| 198 | micro-microfarads | 100 |
| 199 | ohms | 33,000 |
| 200 | micro-microfarads | 100 |
| 203 | ohms | 2200 |
| 204 | millihenries | 5 |
| 205 | micro-microfarads | 470 |
| 210 | ohms | 2200 |
| 217 | micro-microfarads | 15 |
| 222 | ohms | 1000 |
| 223 | micro-microfarads | 1200 |
| 227 | ohms | 1000 |
| 228 | do | 12,000 |
| 229 | micro-microfarads | 47 |
| 230 | ohms | 33,000 |
| 231 | do | 470 |
| 239 | do | 8200 |
| 241 | do | 3300 |
| 242 | do | 1000 |
| 245 | do | 3300 |
| 249 | do | 2200 |
| 250–254 | do | 22,000 |
| 255, 258 | do | 2200 |
| 260 | do | 12,000 |
| 261 | micro-microfarads | 220 |
| 264 | do | 15 |
| 268 | ohms | 8200 |
| 270 | do | 1000 |
| 272 | micro-microfarads | 820 |
| 277 | ohms | 1000 |
| 278 | do | 12,000 |
| 279 | micro-microfarads | 47 |
| 280 | ohms | 4700 |
| 282, 287 | do | 2200 |
| 289 | do | 22,000 |
| 291 | do | 15,000 |
| 292 | micro-microfarads | 820 |
| 296*a* | ohms | 2200 |
| 297–299 | do | 22,000 |
| 303 | micro-microfarads | 47 |
| 307 | ohms | 470 |
| 315, 316 | do | 1000 |
| 320 | do | 8200 |
| 321 | micro-microfarads | 15 |
| 322 | ohms | 12,000 |
| 323 | micro-microfarads | 47 |
| 324 | ohms | 11,610 |
| 325 | micro-microfarads | 820 |
| 326 | ohms | 470 |
| 335, 336 | do | 1000 |
| 339 | do | 12,000 |
| 340 | microfarads | 0.002 |
| 341 | ohms | 47,000 |
| 342 | microfarads | 0.01 |
| 343 | ohms | 12,000 |
| 344 | microfarads | 0.01 |
| 345 | ohms | 470 |

Transistors 74, 75, 76, 212, 236, 237, 256 and 294 may be type 2N358.

Transistors 131, 132, 145, 152, 153, 169, 178, 191, 192, 207, 284, 331, 332 and 347 may be type 2N316.

Transistors 219, 225, 266, 274, 304, 309, 310 and 328 may be type 2N393.

It should be noted that components 176, 186, 223, 230, 239, 245, 324, 325, 341 and 342 should preferably be precision components. A 20% or greater tolerance is permissible in the values of the remaining components.

It may also be again noted that stages 53–60 of the frequency divider chain may have a construction substantially the same as stages 51 and 52 illustrated in FIGURE 3. Delay circuit 73 may be the same as delay circuit 72.

It will be understood that modifications and variations may be effected without departing from the spirit and scope of the novel concepts of this invention.

I claim as my invention:

1. In a system for producing a composite synchronizing signal including horizontal and vertical pulses of different durations, a triggering signal source, a monostable multivibrator having an input circuit connected to said signal source and an output circuit in which a pulse is developed in response to each triggering signal, said multivibrator including a timing circuit the tme constant of which controls the duration of the generated pulses, and switch means associated with said timing circuit to control the time constant thereof and to cause said multivibrator to produce pulses of one duration during the vertical pulse intervals of a different duration during the horizontal pulse intervals.

2. In a system for producing a composite interlace-type synchronizing signal including horizontal, vertical and equalizing pulses of different durations, a triggering signal source, a monostable multivibrator having an input circuit connected to said signal source and an output circuit in which a pulse is developed in response to each triggering signal, said multivibrator including a timing circuit the time constant of which controls a duration of the generated pulses, and switch means associated with said timing circuit to control the time constant thereof and to cause said multivibrator to produce pulses of different durations during the respective horizontal, vertical and equalizing pulse intervals.

3. In a system for producing a composite synchronizing signal including horizontal and vertical pulses of different durations, a triggering signal source, a monostable multivibrator having an input circuit connected to said signal source and an output circuit in which a pulse is developed in response to each triggering signal, said multivibrator including a timing circuit the time constant of which controls the duration of the generated pulses, switch means associated with said timing circuit to control the time constant thereof, means to develop a control signal of one value during the vertical pulse interval and of a different value the remainder of the time, and means applying said control signal to said switch means.

4. In a system for producing a composite interlace-type synchronizing signal including horizontal, vertical and equalizing pulses, an oscillator operative at the repetition rate of the vertical and equalizing pulses, a frequency divider chain connected to said oscillator and including one stage operated at a rate equal to the reciprocal of the duration of each train of vertical pulses and a final stage operated at the repetition rate of the trains of vertical and equalizing pulses, a coincidence circuit having a plurality of inputs connected to said one stage, to said final stage and to at least one other stage intermediate said one stage and said final stage, and means controlled by the output of said coincidence circuit for generating said composite synchronizing signal.

5. In a system for producing a composite interlace-type synchronizing signal including horizontal pulses, trains of vertical pulses, and trains of equalizing pulses preceding and following each train of vertical pulses, each of said trains having the same duration, an oscillator operative at the repetition rate of the vertical and equalizing pulses, a frequency divider chain connected to said oscillator and including a first stage operated at a certain rate equal to the reciprocal of said train duration, a second stage operated at a rate equal to said certain rate divided by a factor at least equal to three and not greater than four, and a final stage operated at the repetition rate of said trains, a coincidence circuit having a plurality of inputs connected to said first, second and final stages, and means controlled by the output of said coincidence circuit for generating said composite synchronizing signal.

6. In a system for producing a composite interlace-type synchronizing signal including horizontal, vertical and equalizing pulses, an oscillator operative at the repetition rate of the vertical and equilizing pulses, a frequency divider chain connected to said oscillator and including a first stage operated at a certain rate equal to the reciprocal of the duration of each train of vertical pulses, a second stage operated at one-half of said certain rate and a final stage operated at the repetition rate of the trains of vertical and equalizing pulses, and a coincidence circuit having a plurality of inputs connected to said first, second and final stages to develop a control signal of one value during the vertical pulse intervals and of another value during the remainder of the time.

7. In a system for producing a composite interlace-type synchronizing signal including horizontal, vertical and equalizing pulses of differing durations, a triggering signal source operative at the repetition rate of the vertical and equalizing pulses, a gate circuit, a monostable multivibrator having an input connected through said gate circuit to said triggering signal source and an output circuit in which a pulse is developed in response to each triggering signal applied to said input circuit, said multivibrator including a timing circuit the time constant of which controls the duration of the generated pulses, switch means associated with said timing circuit to control the time constant thereof and produce pulses of differing durations during the respective horizontal, vertical and equalizing pulse intervals, and means for rendering said gate circuit operative during the entire vertical and equalizing pulse intervals and periodically operative at the horizontal repetition rate the remainder of the time.

8. In a system for producing a composite synchronizing signal including horizontal and vertical pulses, a composite synchronizing pulse generator including multivibrator means and gate means for applying high frequency triggering pulses to said multivibrator means, a frequency divider chain for developing low frequency control pulses, means for applying said control pulses to said composite synchronizing pulse generator, a high frequency generator for developing triggering signals, a delay multivibrator controlled by each triggering signal to switch from one condition to another and then back again after a certain delay time interval, means coupling said delay multivibrator to said frequency divider chain to control said frequency divider chain in response to switching of said delay multivibrator from said one condition to another, and means coupling said delay multivibrator to said gate means for triggering said composite synchronizing multivibrator means in response to switching of said delay multivibrator from said another condition back to said one condition.

9. In a television system for generating synchronizing signals including horizontal blanking and synchronizing pulses, pulse generator means for periodically developing at a high frequency rate a control pulse having leading and trailing edges, a first multivibrator for generating horizontal blanking pulses, a second multivibrator for generating horizontal synchronizing pulses, means for triggering said first multivibrator simultaneously with said trailing edge of said control pulse, an input circuit for said second multivibrator arranged to effect triggering of said second multivibrator in response to signals of a certain polarity opposite the polarity of said control pulse, an oscillatory circuit connected between said pulse generator means and said input circuit and arranged to delay triggering of said second multivibrator until elapse of a certain time interval after the trailing edge of said control pulse.

10. In a television system for generating synchronizing signals including horizontal blanking and synchronizing pulses, pulse generator means for periodically developing at a high frequency rate a control pulse having leading and trailing edges, a first multivibrator for generating horizontal blanking pulses, a second multivibrator for generating horizontal synchronizing pulses, means for triggering said first multivibrator simultaneously with said trailing edge of said control pulse, an input circuit for said second multivibrator arranged to effect triggering of said second multivibrator in response to signals of a certain polarity opposite the polarity of said control pulse, an oscillatory circuit connected between said pulse generator means and said input circuit and arranged to delay triggering of said second multivibrator until elapse of a certain time interval after the trailing edge of said control pulse, said oscillatory circuit comprising an inductor and a capacitor connected in series.

11. In a synchronizing pulse generator, means for producing a low frequency control signal, comprising: a frequency divider responsive to a high frequency input signal and including a plurality of cascade-connected multivibrator stages operated at various sub-multiples of said high frequency, each of said stages being arranged to produce an output signal cyclically shifted and between one value and another, a control device including input and output electrodes, means including a series output impedance for connecting a direct current source in circuit with said output electrode, and a plurality of separate coupling means for applying a plurality of said output signals to said input electrode, said control device being rendered conductive to conduct a certain current through said output impedance when one or more of said output signals is of one value and being rendered nonconductive only when all of said signals are of said another value.

12. In a synchronizing pulse generator, means for producing a low frequency control signal, comprising: a frequency divider responsive to a high frequency input signal and including a plurality of cascade-connected multivibrator stages operated at various sub-multiples of said high frequency, each of said stages being arranged to produce an output signal cyclically shifted between one value and another, a transistor having base, emitter and collector electrodes, means including a series output impedance for connecting a direct current source in circuit with said collector electrode, and a plurality of resistors for separately applying a plurality of said output signals in circuit with said base and emitter electrodes, said transistor being rendered conductive to conduct a certain amount through said output impedance when one or more of said output signals is of one value and being rendered non-conductive only when all of said signals are of said another value.

13. In a synchronizing pulse generator, means for producing a low frequency control signal, comprising: a frequency divider responsive to a high frequency input signal and including a plurality of cascade-connected multivibrator stages operated at various sub-multiples of said high frequency, each of said stages being arranged to produce an output signal cyclically shaped and between one value and another, a control device including input and output electrodes, means including a series output impedance for connecting a direct current source in circuit with said output electrode, a diode having one terminal connected to said input electrode, and a plurality of separate coupling means for applying a plurality of said output signals to the other terminal of said diode, said control device being rendered conductive to conduct a certain amount through said output impedance when one or more of said output signals is of one value and being rendered non-conductive only when all of said signals are of said another value.

14. In a synchronizing pulse generator, means for producing a low frequency control signal, comprising: a frequency divider responsive to a high frequency input signal and including a plurality of cascade-connected multivibrator stages operated at various sub-multiples of said high frequency, each of said stages being arranged to produce an outlet signal cyclically shifted between one value and another, a transistor having base, emitter and collector electrodes, means including a series output impedance for connecting a direct current source in circuit with said collector electrode, a diode, a plurality of resistors for separately applying a plurality of output signals to one terminal of said diode, means connecting the other terminal of said diode in circuit with said base and emitter electrodes, said transistor being rendered conductive to conduct a certain current through said output impedance when one or more of said output signals is of one value and being rendered non-conductive only when all of said signals are of said another value.

15. In a synchronizing pulse generator, means for producing a low frequency control signal, comprising: a frequency divider responsive to a high frequency input signal and including a plurality of cascade-connected multivibrator stages operated at various sub-multiples of said high frequency, each of said stages including a pair of transistors, means for connecting all of said stages to a common direct current supply, said transistors when conducting having a relatively low impedance to act essentially as switches, whereby an output signal is produced from each stage cyclically shifted between one value and another value respectively equal to the potentials of the terminals of the common direct current supply, a control device including input and output electrodes, means including a series output impedance for connecting a direct current source in circuit with said output electrode, and a plurality of separate coupling means for applying a plurality of said output signals to said input electrode, said control device being rendered conductive to conduct a certain amount through said output impedance when one or more of said output signals is of one value and being rendered non-conductive only when all of said signals are of said another value.

16. In a synchronizing pulse generator, means for producing a low frequency control signal, comprising: a frequency divider responsive to a high frequency input signal and including a plurality of cascade-connected multivibrator stages operated at various sub-multiples of said high frequency, each of said stages including a pair of transistors, means for connecting all of said stages to a common direct current supply, said transistors when conducting having a relatively low impedance to act essentially as switches, whereby an output signal is produced from each stage cyclically shifted between one value and another value respectively equal to the potentials of the terminal of the common direct current supply, another transistor having base, emitter and collector electrodes, means including a series output impedance for connecting the direct current source in circuit with said collector electrode, and a plurality of resistors separately applying a plurality of said output signals in circuit with said base and emitter electrodes, said another transistor being rendered conductive to conduct a certain current through said output impedance when one or more said output signals is of one value and being rendered nonconductive only when all of said signals are of said another value.

17. In a system for producing a composite signal including pulses of differing durations, a triggering signal source, a monostable multivibrator having an input circuit connected to said triggering signal source and an output circuit in which a pulse is developed in response to each triggering signal, said multivibrator having a resistor and a capacitor forming a timing circuit the time constant of which controls the duration of the generated pulses, a second resistor, a switching device for connecting said second resistor in parallel with said first-mentioned resistor, and means for automatically operating said switching device thereby to control the duration of the generated pulses.

18. In a system for producing a composite signal including pulses of differing durations, a triggering signal source, a monostable multivibrator having an input circuit connected to said triggering signal source and an output circuit in which a pulse is developed in response to each triggering signal, said multivibrator having a resistor and a capacitor forming a timing circuit the time constant of which controls the duration of the generated pulses, a second resistor, a transistor for connecting said second resistor in parallel with the first-mentioned resistor, and means for applying control signals to said transistor to switch the same between conductive and non-conductive states and thereby control the duration of the generated pulses, said transistor when conducting having an impedance of negligible value compared to the values of said resistors.

19. In a system for producing a composite signal including pulses of differing durations, first and second transistors each having input and output electrodes, means including first and second resistors for respectively connecting output electrodes of said first and second transistors to a direct current source, means including a third resistor for connecting the input electrode of said first transistor to a direct current source to normally bias said first transistor to a conductive state, means coupling the output electrode of said first transistor to the input electrode of said second transistor to render said second transistor non-conductive when said first transistor is conductive, a capacitor connecting the output electrode of said second transistor to said input electrode of said first transistor, means applying a triggering signal to one of said electrodes to cause said first transistor to become non-conductive and said second transistor to become conductive to abruptly change the voltage across the combination of said third resistor and said capacitor after which the charge of said capacitor is changed by current flow through said third resistor to again render said first transistor conductive after a certain time interval, a fourth resistor, and automatically operated switch means for periodically connecting said fourth resistor in parallel with said third resistor to decrease said time interval.

20. In a system for producing a composite signal including pulses of differing durations, first and second transistors each having input and output electrodes, means including first and second resistors for respectively connecting output electrodes of said first and second transistors to a direct current source, means including a third resistor for connecting the input electrode of said first transistor to a direct current source to normally bias said first transistor to a conductive state, means coupling the output electrode of said first transistor to the input electrode of said second transistor to render said second transistor non-conductive when said first transistor is conductive, a capacitor connecting the output electrode of said second transistor to said input electrode of said first transistor, means applying a triggering signal to one of said electrodes to cause said first transistor to become non-conductive and said second transistor to become conductive to abruptly change the voltage across the combination of said third resistor and said capacitor after which the charge of said capacitor is changed by current flow through said third resistor to again render said first transistor conductive after a certain time interval, a fourth resistor, a third transistor for connecting said fourth resistor in parallel with said third resistor, and means for applying control signals to said third transistor to periodically switch the same between conductive and non-conductive states.

21. In a system for producing a composite synchronizing signal including horizontal and vertical pulses of differing durations, a triggering signal source, a monostable multivibrator having an input circuit connected to said signal source and an output circuit in which a pulse is developed in response to each triggering signal, said multivibrator having a resistor and a capacitor forming a timing circuit the time constant of which controls the duration of the generated pulses, a second resistor, switch means normally connected to said second resistor in parallel with the first-mentioned resistor to obtain horizontal pulses of a certain duration, and means for opening said switch means during the vertical pulse intervals to obtain vertical pulses of a certain duration greater than the duration of the horizontal pulses.

22. In a system for producing a composite interlace-type synchronizing signal including horizontal, vertical and equalizing pulses of differing durations, a triggering signal source, a monostable multivibrator having an input circuit connected to said signal source and an output circuit in which a pulse is developed in response to each triggering signal, said multivibrator having a resistor and a capacitor forming a timing circuit the time constant of which controls the duration of the generated pulses, a second resistor, first switch means normally connecting said second resistor in parallel with the first-mentioned resistor to obtain horizontal pulses of a certain duration, means for opening said first switch means during the vertical pulse intervals to obtain vertical pulses of a certain duration greater than the duration of the horizontal pulses, a third resistor, and second switch means operative to connect said third resistor in parallel with said first and second resistors during the equalizing pulse intervals to obtain equalizing pulses of a duration less than the horizontal pulses.

23. In a system for producing a composite interlace-type synchronizing signal including horizontal, vertical and equalizing pulses, an oscillator operative at the repetition rate of the vertical and equalizing pulses, a frequency divider chain connected to said oscillator and including ten binary stages, means for applying a delayed signal from the output of the second stage to the input of the first stage, means for applying a delayed signal from the output of the tenth stage to the inputs of the third, seventh and ninth stages, and a coincidence circuit having a plurality of inputs connected to the outputs of the fourth, fifth, sixth, eighth and tenth stages to develop a control signal of one value duration the vertical pulse interval and of another value the remainder of the time.

24. In a system for producing a composite interlace-type synchronizing signal including horizontal, vertical and equalizing pulses, an oscillator operative at the repetition rate of the vertical and equalizing pulses, a frequency divider chain connected to said oscillator and including ten binary stages, means for applying a delayed signal from the output of the second stage to the input of the first stage, means for applying a delayed signal from the output of the tenth stage to the inputs of the third, seventh and ninth stages, and a coincidence circuit having a plurality of inputs connected to outputs of the fourth, sixth, eighth and tenth stages to develop a control signal of one duration during the equalizing pulse intervals and of another value the remainder of the time.

25. In a system for producing a composite interlace-type synchronizing signal including horizontal, vertical and equalizing pulses, an oscillator operative at the repetition rate of the vertical and equalizing pulses, a frequency divider chain connected to said oscillator and including ten binary stages, means for applying a delayed signal from the output of the second stage to the input of the first stage, means for applying a delayed signal from the output of the tenth stage to the inputs of the third, seventh and ninth stages, a first coincidence circuit having a plurality of inputs connected to outputs of the fourth, fifth, sixth, eighth and tenth stages to develop a control signal of one value duration during the vertical pulse interval and of another value the remainder of the time, and a second coincidence circuit having a plurality of inputs connected to outputs of the fourth, sixth, eighth and tenth stages to develop a control signal of one value during the equalizing pulse intervals and of another value the remainder of the time.

26. In a system for producing a composite signal including pulses of differing durations, a monostable multivibrator including a normally conducting device and a normally non-conducting device, means for applying a high frequency signal to said multivibrator to periodically render said normally conducting device nonconductive and said normally non-conductive device conducting for a certain time interval, and means for applying a low frequency control signal to said multivibrator to prevent said normally conducting device from becoming conductive for a time interval substantially greater than said certain time interval.

27. In a system for producing a composite synchronizing signal including horizontal sync pulses, vertical sync pulses and equalizing pulses, and a composite blanking signal including horizontal and vertical blanking pulses, a high frequency oscillator, means including a frequency divider chain controlled by said oscillator for developing a first low frequency control signal which is on during the vertical pulse interval and off the remainder of the time, a second low frequency control signal which is on during the equalizing pulse intervals and off the remainder of the time and a third low frequency control signal which is on for a certain time interval following completion of the equalizing pulse intervals, means controlled by said first and second control signals and by signals from said high frequency oscillator for generating the composite sync signal, a coincidence circuit responsive to said first, second and third control signals to develop a fourth control signal which is on when anyone of said first, second and third control signals is on and which is off the remainder of the time, and a composite blanking signal generator responsive to said fourth control signal.

28. In a system for producing a composite synchronizing signal including horizontal sync pulses, vertical sync pulses and equalizing pulses, and a composite blanking signal including horizontal and vertical blanking pulses, a high frequency oscillator, means including a frequency divider chain controlled by said oscillator for developing a first low frequency control signal which is on during the vertical pulse interval and off the remainder of the time, a second low frequency control signal which is on during the equalizing pulse intervals and off the remainder of the time and a third low frequency control signal which is on for a certain time interval following completion of the equalizing pulse intervals, means controlled by said first and second control signals and by signals from said high frequency oscillator for generating the composite sync signal, a coincidence circuit responsive to said first, second and third control signal to develop a fourth control signal which is on when anyone of said first, second and third control signals is on and which is off the remainder of the time, a divide-by-two multivibrator responsive to signals derived from high frequency oscillator, and a composite blanking signal generator responsive to the output of said divide-by-two multivibrator and to said fourth control signal.

References Cited in the file of this patent

UNITED STATES PATENTS

| | | |
|---|---|---|
| 2,515,613 | Schloenfeld | July 18, 1950 |
| 2,766,379 | Pugsley | Oct. 9, 1956 |

OTHER REFERENCES

"Transistor Electronics," Lo et al., published by Prentice Hall, Inc., 1955 (page 501 relied on).